United States Patent [19]
Shinohara et al.

[11] Patent Number: 6,007,638
[45] Date of Patent: *Dec. 28, 1999

[54] DETERGENT COMPOSITION AND CLEANING METHOD USING THE SAME

[75] Inventors: Akira Shinohara, Tokyo; Hirotoshi Ushiyama, Chiba-ken; Miwa Sugano, Tokyo; Naoaki Sakurai, Tokyo; Noriko Okoshi, Tokyo; Toshiharu Nakagawa, Tokyo, all of Japan

[73] Assignee: Lion Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/799,660

[22] Filed: Feb. 11, 1997

[30] Foreign Application Priority Data

Feb. 13, 1996 [JP] Japan .................................. 8-025154

[51] Int. Cl.$^6$ .................................................. C03C 23/00
[52] U.S. Cl. .................................. 134/2; 134/1; 134/1.3; 134/3; 134/6; 134/26; 134/29; 134/40
[58] Field of Search .................................. 134/1, 1.2, 1.3, 134/2, 3, 6, 9, 32, 33, 40, 42, 26, 29

[56] References Cited

FOREIGN PATENT DOCUMENTS

| | | |
|---|---|---|
| 03062018 | 3/1991 | Japan . |
| 03081730 | 4/1991 | Japan . |
| 04170500 | 6/1992 | Japan . |
| 5-179289 | 7/1993 | Japan . |
| 05264942 | 10/1993 | Japan . |
| 6-138667 | 5/1994 | Japan . |
| 6-299200 | 10/1994 | Japan . |
| 6-313191 | 11/1994 | Japan . |
| 6-313192 | 11/1994 | Japan . |
| 6-340896 | 12/1994 | Japan . |
| 7-133496 | 5/1995 | Japan . |
| 7-118698 | 12/1995 | Japan . |

*Primary Examiner*—Randy Gulakowski
*Assistant Examiner*—Alexander Markoff
*Attorney, Agent, or Firm*—Fish & Richardson P.C.

[57] ABSTRACT

A detergent composition for cleaning the surface of a substrate prior to or after application of an organic or inorganic thin film thereon, comprises: (A) a compound selected from the compounds represented by the formula: $R_1$—O—$(A_1O)_n$—$R_2$ (wherein $R_1$ represents an alkyl or alkenyl group having 1 to 7 carbon atoms or a phenyl group; $A_1$ represents an alkylene group having 2 to 4 carbon atoms; $R_2$ represents an alkyl or alkenyl group having 1 to 6 carbon atoms or a hydrogen atom; and n is a numerical value ranging from 1 to 6); (B) a compound selected from at least one of those represented by the formulas: $R_3$—O—$(A_2O)_m$—H and $R_4$—O—$(A_3O)_m$—H (wherein $R_3$ represents an alkylphenyl or alkenylphenyl group having 12 to 25 carbon atoms; $A_2$ represents an alkylene group having 2 to 4 carbon atoms; $R_4$ represents an alkyl or alkenyl group having 8 to 25 carbon atoms; $A_3$ represents an alkylene group having 2 to 4 carbon atoms; and m is a numerical value ranging from 5 to 25). The detergent composition is effective for cleaning the surface of a substrate prior to or after forming an organic or inorganic thin film thereon during LCD production processes.

7 Claims, No Drawings

DETERGENT COMPOSITION AND CLEANING METHOD USING THE SAME

BACKGROUND OF THE INVENTION

The present invention relates to a detergent composition for precision cleaning, which is effective for cleaning the surface of a substrate prior to forming an organic or inorganic thin film on the surface of the substrate, and further cleaning an organic resin layer formed on the substrate surface during, for instance, liquid crystal display (LCD) device production processes, as well as a cleaning method using the detergent composition.

A polymer film of a polyimide and the like applied onto the surface of a substrate during, for instance, LCD device-production processes is subjected to a rubbing treatment for liquid crystal-orientation. The rubbed polyimide surface should be treated by precision cleaning because of the presence of pieces of the polyimide film, a rubbing cloth, peeled pieces of human tissues or cells, oils and fats released therefrom, and the like adhered to the surface.

These polymer films have conventionally been washed using a solvent such as a freon or isopropyl alcohol (IPA) or pure water or using a nonionic surfactant. However, the cleaning with the solvent suffers from problems of low safety to environment and high flammability. In addition, pure water does not show a sufficient detergency, while the cleaning using a combination of a nonionic surfactant and pure water is attended by such a bad effect that the yield is substantially reduced due to the surfactant remaining on the surface of the polyimide film. For this reason, there has increasingly been desired for the development of a surfactant which hardly remains on the surface of such a film to thus improve the yield and which can ensure high detergency.

For instance, Japanese Un-Examined Patent Publication (hereinafter referred to as "J.P. KOKAI") No. Hei 3-62018 proposes a method comprising ultrasonically cleaning the surface of a substrate with pure water to thus simultaneously obtain a stable pretilting angle in addition to an excellent cleaning effect, but the detergency of the method does not satisfy the degree of cleanliness recently required.

In addition, J.P. KOKAI No. Hei 3-81730 proposes a method for cleaning such a polymer film surface by scrubbing the surface with, for instance, a sponge, but it is difficult to completely eliminate the dust-generation during the scrubbing operation and it is not expected to obtain an effect of cleaning fats and oils released from peeled pieces of human tissues or cells.

Moreover, J.P. KOKAI No. Hei 5-264942 proposes a method for cleaning such a polymer film surface with pure water which also permits the cleaning off of an agent for enhancing the adhesion of the polymer film in addition to the residues present on the surface after rubbing operations by the employment of special process designed in such a manner that the surfactant play the role of the prevention of re-adhesion of the residues. However, there is a limit in the ability of water to peel off the residues from the surface.

Furthermore, J.P. KOKAI No. Hei 4-170500 proposes a detergent composition for cleaning LCD cells which comprises a nonionic surfactant as a principal component. However, this proposal relates to a finish-cleaning of an LCD cell after the production thereof and therefore, the purpose of this method and the effects thereof are different from those of the present invention.

SUMMARY OF THE INVENTION

Accordingly, it is an object of the present invention to provide a detergent composition which has high detergency and hardly remains on the surface of a substrate to be treated, which is used for cleaning the surface of a substrate prior to application of an organic or inorganic thin film on the substrate during processes for producing, LCD cells and the like, and for cleaning an organic resin layer applied onto the surface of a substrate and which permits improvement in the yield of semiconductor devices and peripheral devices thereof.

Another object of the present invention is to provide a high quality cleaning method using the foregoing detergent composition, which can ensure a low rate of the composition remaining on the treated surface.

Other objects and features of the present invention will be more apparent from the following description.

The present invention has been developed on the basis of such a finding that the foregoing problems associated with the conventional techniques can effectively be solved by the simultaneous use of a plurality of alkylene oxide type specific nonionic compounds which differ in the number of carbon atoms included in the hydrophobic group.

According to an aspect of the present invention, there is provided a detergent composition for cleaning the surface of a substrate prior to application of an organic or inorganic thin film on the substrate, which comprises the following components (A) and (B):

(A) a compound selected from the group consisting of the compounds represented by the following general formula (1):

$$R_1-O-(A_1O)_n-R_2 \quad (1)$$

(wherein $R_1$ represents an alkyl or alkenyl group having 1 to 7 carbon atoms or a phenyl group; $A_1$ represents an alkylene group having 2 to 4 carbon atoms; $R_2$ represents an alkyl or alkenyl group having 1 to 6 carbon atoms or a hydrogen atom; and n is a numerical value ranging from 1 to 6);

(B) a compound selected from the group consisting of the compounds represented by the following general formulas (2) and (3):

$$R_3-O-(A_2O)_m-H \quad (2)$$

(wherein $R_3$ represents an alkylphenyl or alkenylphenyl group having 12 to 25 carbon atoms; $A_2$ represents an alkylene group having 2 to 4 carbon atoms; and m is a numerical value ranging from 5 to 25);

$$R_4-O-(A_3O)_m-H \quad (3)$$

(wherein $R_4$ represents an alkyl or alkenyl group having 8 to 25 carbon atoms; $A_3$ represents an alkylene group having 2 to 4 carbon atoms; and m is an integer ranging from 5 to 25).

According to another aspect of the present invention, there is also provided a detergent composition for cleaning the surface of a substrate after application of an organic or inorganic thin film such as an organic resin layer to the surface, which comprises the foregoing components (A) and (B).

According to a further aspect of the present invention, there is provided a method for cleaning the surface of a substrate for application of an organic or inorganic thin film thereon or the surface of a substrate having an organic thin film thereon which comprises the step of cleaning the surface of the substrate with the detergent composition.

DESCRIPTION OF THE PREFERRED EMBODIMENTS

The substituent $R_1$ of the compound represented by the general formula (1) and used as the component (A) of the detergent composition according to the present invention is a saturated or unsaturated aliphatic hydrocarbon group having 1 to 7 carbon atoms or a phenyl group. The substituent $R_2$ of the compound represented by the general formula (1) is a saturated or unsaturated aliphatic hydrocarbon group having 1 to 6 carbon atoms or a hydrogen atom. The moiety $A_1O$ in the general formula (1) may be an oxyethylene, oxypropylene or oxybutylene or mixture thereof, with a block adduct of oxyethylene and oxypropylene being particularly preferred. n means the molar number of added alkylene oxide(s) and may vary in the range of from 1 to 6. In case of a mixed block adduct of oxyethylene and oxypropylene, preferred are those obtained by adding 1 to 3 moles of oxyethylene with 1 to 3 moles of oxypropylene. More considerable improvement in the detergency and more effective reduction in the rate of the nonionic surfactant remaining on the treated surface can be ensured by combining oxyethylene and oxypropylene, controlling the HLB value of the resulting adduct to the range of from 3 to 12 and appropriately adjusting the conformation in the molecular structure thereof.

Moreover, alkylene oxide adducts of alcohols having 4 to 6 carbon atoms are preferably used in the present invention as the component (A), with adducts of 1 to 3 moles of oxyethylene and 1 to 3 moles of oxypropylene being preferred when using an alcohol having 4 carbon atoms and those of 1 to 3 moles of oxyethylene being preferred when using an alcohol having 6 carbon atoms.

The compound represented by the general formula (2) used as the component (B) is an alkylene oxide adduct of an alkylphenol or alkenylphenol having 12 to 25 carbon atoms. Among these, preferred are alkylene oxide adducts of octylphenol and nonylphenol. The symbol $(A_2)_m$ in the general formula (2) means that 5 to 25 moles, preferably 8 to 15 moles of oxyethylene, oxypropylene, oxybutylene or mixture thereof are added.

The compound represented by the general formula (3) used as the component (B) is an alkylene oxide adduct of a saturated or unsaturated alcohol having 8 to 25 carbon atoms. Among these, preferred are such adducts of secondary alcohols having 10 to 16 carbon atoms. The symbol $(A_3O)$ in the general formula (3) means that 5 to 25 moles, preferably 8 to 15 moles of oxyethylene, oxypropylene, oxybutylene or mixture thereof are added.

Each component (A) or (B) may comprise at least one compound selected from those listed above. The component (B) may be one or at least two compounds selected from at least one of the compounds represented by Formulas (2) and (3) and the combination thereof is not limited to any specific one. More specifically, the component (B) may be at least two members selected from the group consisting of the compounds represented by Formula (2) or the component (B) may be at least two members selected from the group consisting of the compounds represented by Formula (3) or the component (B) may be a combination of at least one member selected from the compounds represented by Formula (2) with at least one member selected from the compounds represented by Formula (3).

The detergent composition of the present invention may comprise the components (A) and (B) in any mixing ratio, but it is most effective to incorporate, into the detergent composition, 3 to 30% by weight, preferably 5 to 20% by weight of the component (A) and 1 to 50% by weight, preferably 10 to 40% by weight of the component (B) on the basis of the total weight of the detergent composition (100% by weight) while taking into consideration the detergency and the rate of the nonionic surfactant remaining on the treated surface. Preferably, the detergent composition is in general diluted with water, preferably de-ionized water, to give an aqueous solution having a concentration ranging from 20 to 95% by weight.

The detergent composition of the present invention is mainly designed in such a manner that a surface chemical action required for cleaning is imparted thereto and accordingly, there may, if necessary, be incorporated into the composition, for instance, agents possessing chemical cleaning actions such as sulfuric acid, hydrofluoric acid, hydrogen peroxide, inorganic alkalis, e.g., caustic soda, monoethanolamine, diethanolamine, triethanolamine and quaternary ammonium hydroxides; and a chelating agent, in addition to the foregoing essential components. In this case, the detergent composition desirably comprises, on the basis of the total weight of the composition (100% by weight), 3 to 30% by weight, preferably 5 to 20% by weight of the component (A); 1 to 50% by weight, preferably 10 to 40% by weight of the component (B); and 1 to 50% by weight, preferably 5 to 40% by weight of such arbitrary components.

As will be discussed in detail in Examples given below, the improvement in the detergency of a detergent composition originated from a zeta potential is greatly dependent upon the pH value of the detergent composition used in the cleaning of a glass substrate and thus it is desirable to blend the detergent composition such that the pH value of the liquid cleaning base is not less than 10. On the other hand, in a system in which the improvement in the detergency due to such pH adjustment is not anticipated, the foregoing auxiliary agents are incorporated into the composition in such a manner that the liquid cleaning base has a pH value ranging from 6 to 8 while taking into consideration the stability of the material to be cleaned.

When using the composition in cleaning processes, the detergent composition may be firstly diluted with water to a concentration ranging from 0.1 to 10% by weight, preferably 0.3 to 3% by weight and then the surface of a substrate before and after an organic or inorganic thin film is applied thereto in the cleaning solution to thus clean the surface, but the more excellent cleaning effect can be ensured if the cleaning treatment is carried out while applying ultrasonics. For example, the surface of the substrate is contacted with the cleaning solution, for example, for 10 seconds to 20 minutes at a room temperature to about 50° C. Specifically, the surface of the substrate is immersed into the cleaning solution, preferably while applying ultrasonics, or the cleaning solution is showered to the surface of the substrate. After cleaning, the surface of the substrate is washed with de-ionized water. Moreover, it is preferred to carry out the cleaning treatment using a cleaning solution prepared by diluting, with water, the detergent composition to a concentration ranging from 0.1 to 10% by weight, preferably 0.3 to 3% by weight and a brush which can move relative to the substrate surface, depending on the kinds of the substrate to be cleaned.

Examples of substrates to which the detergent composition of the present invention can be applied are raw or original plates used for preparing LCD cells such as various kinds of glass plates and quartz plates; array substrates such as thin film transistor substrates each of which comprises such a raw plate and switching elements such as thin film transistor formed on the raw plate; LCD substrates provided thereon with polymer films of, for instance, polyvinyl alcohol and polyimide; and LCD substrates provided thereon with inorganic insulating films of, for instance, silicon oxide and silicon nitride.

The detergent composition of the present invention desirably has a content of metallic impurities as low as possible. More specifically, the content of Na element is preferably not more than 1 ppm and those of other metallic impurities (such as Fe, Cu, Mg, Al, K, Ca, Mn, Ni, Ag, Cr, Zn and Pb) each is preferably not more than 0.1 ppm. This is because these metallic impurities have a bad influence upon, for instance, semiconductors. As has been discussed above, the reduction of the metallic impurity content permits the reduction of the content of the foregoing metals during using the cleaning solution down to not more than 10 ppb. This can in turn eliminate any danger of contamination due to the use of the detergent and high quality and precision cleaning can be expected.

The detergent composition of the present invention has excellent permeability and this in turn permits substantial improvement of the detergency thereof and can suppress the reduction in the yield due to stains and dirt remaining on the treated surface.

Moreover, the component (A) inhibits the adhesion of the highly adhesive component (B) to the treated surface and permits rapid release thereof from the surface during rinsing the same to thus prevent the detergent from remaining thereon and to eliminate any difficulty due to the presence of residual detergent. Therefore, if the detergent composition is used for washing off fats and oils and dusts adhered to the substrate surface, the detergent composition shows excellent detergency. Therefore, if the composition is used for cleaning LCD (liquid crystal display) devices, any property of the device is not impaired at all since the surface of the substrate is completely free of any residual detergent. In addition, the detergent composition of the present invention has low BOD and COD values and accordingly, is quite excellent in the compatibility to environment.

The present invention will hereinafter be described in more detail with reference to the following Examples, but the present invention is not restricted to these specific Examples. In the following Examples, the term "%" means "% by weight" unless otherwise specified.

EXAMPLES 1 TO 10
(Cleaning of Original LCD Glass Plate)

There were prepared detergent compositions each having the formulation detailed in the following Table 1 (while making up for the deficiency with de-ionized water). Various properties thereof were evaluated as follows. The results thus obtained are listed in Table 1.

(1) Evaluation of Detergency

Original LCD glass plates were used as test pieces, i.e., substances to be cleaned, which had been allowed to stand in a room for one week to thus contaminate it with dusts and oily stain (tallow) present in the room.

After preparing a cleaning solution by diluting each detergent prepared above to a concentration of 3%, the foregoing test pieces were immersed in the cleaning solution maintained at 50° C. for 5 minutes while applying ultrasonics, followed by subjecting them to spray-rinsing for one minute with de-ionized water.

The ability of each detergent to clean the original LCD glass plate were evaluated by the following method.

(i) Evaluation of Ability of Detergent Composition to Clean off Oily Stains in Terms of Wettability After rinsing, the cleaning ability of each detergent composition was evaluated in terms of the wettability of glass by water on the basis of the following evaluation criteria:

⊚: The glass plate is sufficiently cleaned and the entire surface thereof is wet with water;

○: A part of the glass plate is insufficiently cleaned and a part of the glass surface repels water;

Δ: Only a part of the glass plate is cleaned and almost whole glass surface repels water; and X: The glass plate is not cleaned and the entire surface thereof repels water.

(ii) Evaluation of Ability of Detergent Composition to Clean off Dust (Particulate Stain) by Microscopic Observation After rinsing the test piece, it was sufficiently dried to such an extent that any dust was not adhered thereto, followed by observation of the surface thereof through a microscope to thus evaluate the cleaning ability of each detergent composition according to the following evaluation criteria:

⊚: The presence of any dust is not confirmed by the microscopic observation;

○: There are observed several dust particles per 1 $cm^2$;

Δ: There are observed dust particles of ½ time that initially observed on the surface prior to the cleaning operation; and X: There are observed the same number of dust particles as that initially observed prior to the cleaning operation.

TABLE 1

| Ex No. | 1 | 2 | 3 | 4 | 5 |
|---|---|---|---|---|---|
| Component Incorporated (wt %) | | | | | |
| $C_4H_9O(EO)_2C_4H_9$ | | | | | |
| $C_4H_9O(EO)_2H$ | | | | | 30 |
| $C_4H_9O(EO)_3H$ | 20 | | | | |
| $C_4H_9O(EO)_1(PO)_1H$ | | | | | |
| $C_4H_9O(EO)_1(PO)_2H$ | | 15 | | | |
| $C_6H_{13}O(EO)_2H$ | | | | | 20 |
| $C_6H_5O(PO)_1H$ | | | 20 | | |
| Lauryl Alcohol $(EO)_8H$ | | | 10 | | |
| $C_{12-14}$ Secondary Alcohol $(EO)_8H$ | | | | 10 | |
| $C_{12-14}$ Secondary Alcohol $(EO)_{15}H$ | 30 | | | 20 | |
| Isooctanol $(EO)_6H$ | | | | | |
| Nonylphenol $(EO)_8H$ | | 10 | | | |
| Nonylphenol $(EO)_{16}H$ | | 15 | 20 | | 30 |
| Tetramethylammonium Hydroxide | 10 | 10 | 10 | 10 | 10 |
| pH of Cleaning Base Solution | 12.5 | 12.5 | 12.5 | 12.5 | 12.5 |
| Results of Evaluation (Detergency) | | | | | |
| Original LCD Glass Plate | | | | | |
| Oily Stain-Cleaning off Ability | ○~⊚ | ⊚ | ○~⊚ | ○~⊚ | ⊚ |
| Particulate Stain-Cleaning off Ability | ⊚ | ⊚ | ○~⊚ | ○~⊚ | ⊚ |

| Ex. No. | 6 | 7 | 8 | 9 | 10 |
|---|---|---|---|---|---|
| Component Incorporated (wt %) | | | | | |
| $C_4H_9O(EO)_2C_4H_9$ | | 10 | | | |
| $C_4H_9O(EO)_2H$ | | | | | |
| $C_4H_9O(EO)_3H$ | | | 20 | | |
| $C_4H_9O(EO)_1(PO)_1H$ | 30 | | | | 20 |
| $C_4H_9O(EO)_1(PO)_2H$ | | | | 20 | |
| $C_6H_{13}O(EO)_2H$ | | 10 | | | |
| $C_6H_5O(PO)_1H$ | | | | | |
| Lauryl Alcohol $(EO)_8H$ | | | | | |
| $C_{12-14}$ Secondary Alcohol $(EO)_8H$ | 20 | 30 | 30 | | 10 |
| $C_{12-14}$ Secondary Alcohol $(EO)_{15}H$ | | | | | |
| Isooctanol $(EO)_6H$ | 10 | | | | |
| Nonylphenol $(EO)_8H$ | | | | 20 | |
| Nonylphenol $(EO)_{16}H$ | | | | | |
| Tetramethylammonium Hydroxide | 10 | 10 | — | — | — |
| pH of Cleaning Base Solution | 12.5 | 12.5 | 6.5 | 6.5 | 6.5 |

TABLE 1-continued

Results of Evaluation (Detergency)

Original LCD Glass Plate

| | | | | | |
|---|---|---|---|---|---|
| Oily Stain-Cleaning off Ability | o~⊚ | o~⊚ | o~⊚ | o~⊚ | o~⊚ |
| Particulate Stain-Cleaning off Ability | o~⊚ | o~⊚ | o~⊚ | o~⊚ | o~⊚ |

Note: Symbols "EO" and "PO" in Table 1 mean ethylene oxide and propylene oxide groups, respectively and the numerical values each means the average added molar number of ethylene oxide or propylene oxide group.

EXAMPLES 11 TO 17
(Cleaning of Polyimide Film)

There were prepared detergent compositions each having the formulation detailed in the following Table 2 (while making up for the deficiency with deionized water). Various properties thereof were evaluated as follows. The results thus obtained are listed in Table 2.

(1) Evaluation of Detergency

Original LCD glass plates each was coated with a polyimide film, followed by allowing to stand in a room for one week to thus adhere dust particles and oily stains (tarrow) present in the room to these plates and the resulting plates were used as test pieces.

After preparing a cleaning solution by diluting each detergent prepared above to a concentration of 3%, the foregoing test pieces were immersed in the cleaning solution maintained at 50° C. for 5 minutes while applying ultrasonics, followed by subjecting them to spray-rinsing for one minute with de-ionized water and then each detergent composition was evaluated by the same method used in Example 1.

(2) Estimation of Rate of Residual Detergent

Original LCD glass plates each was coated with a polyimide film, followed by sufficient washing with isopropyl alcohol (IPA) to thus give clean polyimide surface.

After preparing a cleaning solution by diluting each detergent prepared above to a concentration of 3%, the foregoing test pieces were immersed in the cleaning solution maintained at 50° C. for 5 minutes while applying ultrasonics, followed by subjecting them to spray-rinsing for one minute with de-ionized water and then drying.

The contact angle between the polyimide film cleaned with each detergent composition and water or methylene bromide was determined in a direction at 60° to the rubbing direction using an FACE automatic contact angle-determining device of CA-Z Type followed by comparison of these results with the contact angle of a clean polyimide film according to the following formula 1:

$$\text{Cleanliness Index } (\alpha) = |\theta iH2O - \theta AH2O| + |\theta iMeBr - \theta AMeBr| \quad (1)$$

wherein θ iH20 means a contact angle between a clean polyimide film and water; θ AH20 represents a contact angle between a clean polyimide film and water observed when the surfactant molecules are adhered to the film; θ iMeBr represents a contact angle between a clean polyimide film and methylene bromide; and θ AMeBr represents a contact angle between a clean polyimide film and methylene bromide observed when the surfactant molecules are adhered to the film.

If surfactant molecules remain on the polyimide film, the contact angle of the polyimide film to each solvent varies in proportion to the rate of residual surfactant molecules and therefore, the rate of residual detergent can be evaluated by comparing the cleanliness index (α) with one another. For this reason, the rate of each residual detergent was evaluated using the foregoing value a as an indication on the basis of the following criteria:

○: 0≦α<4: The polyimide surface is clean and thus the rate of residual detergent is low.

Δ: 4≦α<8: The corresponding detergent remains on the polyimide film and thus the surface condition thereof is slightly changed.

X: 8≦α: The surface condition thereof is changed due to the corresponding detergent remaining on the surface.

TABLE 2

| Ex. No. | 11 | 12 | 13 | 14 | 15 | 16 | 17 |
|---|---|---|---|---|---|---|---|
| Component Incorporated (wt %) | | | | | | | |
| $C_4H_9O(EO)_2C_4H_9$ | | | | | | | 10 |
| $C_4H_9O(EO)_1H$ | | 30 | | | | | |
| $C_4H_9O(EO)_3H$ | | | | | | 30 | |
| $C_4H_9O(EO)_1(PO)_1H$ | | | | 30 | | | |
| $C_4H_9O(EO)_1(PO)_2H$ | | | 10 | | | | |
| $C_6H_{13}O(EO)_2H$ | 30 | | | | | | 20 |
| $C_6H_5O(PO)_1H$ | | | | | 20 | | |
| Lauryl Alcohol $(EO)_8H$ | | | | | | 30 | |
| $C_{12-14}$ Secondary Alcohol $(EO)_8H$ | 10 | 10 | | | | | 20 |
| $C_{12-14}$ Secondary Alcohol $(EO)_{15}H$ | 20 | | | | | | |
| Isooctanol $(EO)_6H$ | | | | 30 | | | |
| Nonylphenol $(EO)_8H$ | | | 10 | | 10 | | |
| Nonylphenol $(EO)_{16}H$ | | 20 | 10 | | 20 | | |
| pH of Cleaning Base Solution | 6.5 | 6.5 | 6.5 | 6.5 | 6.5 | 6.5 | 6.5 |
| Results of Evaluation (Detergency) | | | | | | | |
| Polyimide Film | | | | | | | |
| Oily Stain-Cleaning off Ability | o | o | o | o | o | o | o |
| Particulate Stain-Cleaning off Ability | ⊚ | o~⊚ | ⊚ | o~⊚ | ⊚ | o~⊚ | o~⊚ |
| Results of Evaluation (Remaining Properties) | | | | | | | |
| Polyimide Film | | | | | | | |
| Rate of Residual Detergent | o | o | o | o | o | o | o |

COMPARATIVE EXAMPLE 1 TO 15

There were prepared detergent compositions each having the formulation detailed in the following Tables 3 and 4 (while making up for the deficiency with de-ionized water). The detergency and the rate of residual detergent were evaluated according to the above-mentioned Examples. The results thus obtained are listed in Tables 3 and 4.

TABLE 3

| Comp. Ex. No. | 1 | 2 | 3 | 4 | 5 |
|---|---|---|---|---|---|
| Component Incorporated (wt %) | | | | | |
| $C_4H_9O(EO)_1H$ | 30 | | | | |
| $C_6H_{13}O(EO)_1H$ | | | | 20 | |
| $C_6H_{13}OH$ | | | 20 | | |
| $C_{12-14}$ Secondary Alcohol $(EO)_{10}H$ | | | | | |
| Nonylphenol $(EO)_{10}H$ | | 30 | 20 | | |
| Nonylphenol $(EO)_{50}H$ | | | | | 20 |

TABLE 3-continued

| Compound A | | | | | 30 |
|---|---|---|---|---|---|
| Tetramethyl Ammonium Hydroxide | 10 | 10 | 10 | 10 | 10 |
| pH of Cleaning Base Solution | 12.5 | 12.5 | 12.5 | 12.5 | 12.5 |
| Results of Evaluation (Detergency) | | | | | |
| Original LCD Glass Plate | | | | | |
| Oily Stain-Cleaning off Ability | Δ~x | o~Δ | x | Δ~x | o~Δ |
| Particulate Stain-Cleaning off Ability | Δ~x | Δ | x | Δ | Δ~x |

| Comp. Ex. No. | 6 | 7 | 8 | 9 |
|---|---|---|---|---|
| Component Incorporated (wt %) | | | | |
| $C_4H_9O(EO)_1H$ | | | | 20 |
| $C_6H_{13}O(EO)_1H$ | | | | |
| $C_6H_{13}OH$ | | | | |
| $C_{12-14}$ Secondary Alcohol $(EO)_{10}H$ | 30 | | 30 | |
| Nonylphenol $(EO)_{10}H$ | | 30 | | |
| Nonylphenol $(EO)_{50}H$ | | | | 20 |
| Compound A | | | | |
| Tetramethyl Ammonium Hydroxide | 10 | — | — | — |
| pH of Cleaning Base Solution | 12.5 | 6.5 | 6.5 | 6.5 |
| Results of Evaluation (Detergency) | | | | |
| Original LCD Glass Plate | | | | |
| Oily Stain-Cleaning off Ability | Δ | Δ~x | Δ~x | Δ~x |
| Particulate Stain-Cleaning off Ability | Δ~x | x | x | x |

Compound A is represented by the following chemical formula (m+n=15; Compound A used in the following Table is also the same as that defined below):

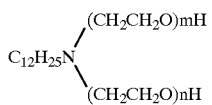

TABLE 4

| Comp. Ex. No. | 10 | 11 | 12 | 13 | 14 | 15 |
|---|---|---|---|---|---|---|
| Component Incorporated (wt %) | | | | | | |
| $C_4H_9O(EO)_1H$ | 30 | | | | | |
| $C_6H_{13}O(EO)_1H$ | | | | 20 | | |
| $C_6H_{13}OH$ | | | 20 | | | |
| $C_{12-14}$ Secondary Alcohol $(EO)_{10}H$ | | | | | | 30 |
| Nonylphenol $(EO)_{10}H$ | | 30 | 20 | | | |
| Nonylphenol $(EO)_{50}H$ | | | | 20 | | |
| Compound A | | | | | 30 | |
| pH of Cleaning Base Solution | 6.5 | 6.5 | 6.5 | 6.5 | 6.5 | 6.5 |
| Results of Evaluation (Detergency) | | | | | | |
| Polyimide Film | | | | | | |
| Oily Stain-Cleaning off Ability | x | Δ | x | Δ~x | Δ | Δ |
| Particulate Stain-Cleaning off Ability | x | Δ | x | Δ | Δ | Δ |
| Results of Evaluation (Remaining Properties) | | | | | | |
| Polyimide Film | | | | | | |
| Rate of Residual Detergent | o | Δ | x | Δ | x | Δ |

EXAMPLE 18
(Cleaning of Thin Film Transistor Substrate)

The detergent composition of Example 13 was used in the inspection of aluminum distributing wires formed by depositing aluminum, in a thickness of 200 nm, on a thin film transistor substrate (TFT-LCD) for corrosion due to the detergent. The detergent composition of Example 13 had an almost neutral pH even during the dilution thereof and therefore, it was confirmed that the detergent composition did not cause any corrosion of the aluminum distributing wires. In this respect, it was also confirmed that almost the same results were observed for the detergent compositions prepared in the other Examples. The results thus obtained are summarized in the following Table 5.

TABLE 5

| | pH | Immersion Conditions | Result |
|---|---|---|---|
| Stock Soln. | 4.64 | immersed for 10 min. | not corroded |
| Diluted with pure water to 1% | 6.66 | immersed for 1 min. | not corroded |
| | | immersed for 3 min. | not corroded |
| | | immersed for 5 min. | not corroded |
| | | immersed for 10 min. | not corroded |
| Diluted with pure water to 3% | 6.56 | immersed for 1 min. | not corroded |
| | | immersed for 3 min. | not corroded |
| | | immersed for 5 min. | not corroded |
| | | immersed for 10 min. | not corroded |

EXAMPLE 19
(Ability of Detergent Composition to Clean Transparent Conductive Film)

The detergent composition of Example 13 was diluted with pure water to a desired concentration to give a detergent solution, followed by determination of the contact angle between the transparent conductive film after the cleaning and pure water and methylene iodide to thus evaluate the ability of the detergent composition to clean the transparent conductive film (ITO). The cleaning was carried out by spraying the detergent solution on a transparent conductive film (ITO) in the form of a shower, treating the film by moving a rotating brush relatively to the film for one minute and then rinsing it with pure water for 2 minutes. Moreover, the BOD and COD values of each wash liquid were also determined.

By way of comparison, the film was also cleaned with a detergent solution simply comprising 30% by weight of polyoxyethylene nonylphenyl ether (hereinafter referred to as "comparative composition"; NCW601A, available from Wako Pure Chemical Co., Ltd.) and the foregoing properties were likewise determined. The results thus obtained are listed in the following Table 6.

TABLE 6

| | Relative Contact Angle | | BOD (ppm) | COD (ppm) |
|---|---|---|---|---|
| | pure $H_2O$ | $CH_2I_2$ | | |
| Composition of Example 13 | | | | |
| Diluted with pure water to 0.5% | 0.81 | 0.89 | 740 | 1076 |
| Diluted with pure water to 1.0% | 0.70 | 0.79 | — | — |
| Comparative Composition | | | | |
| Diluted with pure water to 0.5% | 1 | 1 | 1417 | 1320 |

*: The relative contact angle is expressed in terms of a value relative to that observed for the comparative composition (which is defined to be 1).

The foregoing results indicate that the detergent composition of the present invention can ensure sufficient cleaning and accordingly, the contact angle of the treated surface to pure water is small and that the composition of the invention hardly remains on the treated surface and accordingly, the contact angle of the surface to methylene iodide is also small.

Moreover, both of the BOD and COD values of each wash liquid were small and therefore, the rinsing operation does not require a large amount of industrial water. This clearly indicates that the detergent composition of this Example is also excellent from the economical standpoint. It was also confirmed that the detergent compositions prepared in the other Examples also showed excellent effects as compared with the comparative composition.

EXAMPLE 20
(Liquid Crystal-Supporting Properties)

The product of Example 13 was used as a detergent composition, followed by dilution thereof to give a detergent solution, spraying the detergent solution on a thin film transistor substrate (TFT-LCD) in the form of a shower, treating the film by moving a rotating brush relatively to the substrate for one minute and then rinsing it with pure water for 2 minutes. Thereafter a polyimide film was applied onto the substrate, followed by drying and subjecting to a rubbing treatment in a desired direction to thus form an orientated polyimide film. Then the substrate was cleaned with the same detergent solution while applying ultrasonics to remove foreign substances such as dusts adhered to the principal plane of the orientated film and then rinsed with pure water for one minute.

The thin film transistor substrate (TFT-LCD) thus prepared and an opposite substrate which had likewise been cleaned in the same manner were bonded to one another at a predetermined space, followed by injecting each of two different kinds of twisted nematic liquid crystals into the space between these substrates and then sealing to give two kinds of liquid crystal cells. Then a voltage of 10 V was established between electrodes opposed to one another and then the retention (the ratio: voltage detected after the elapse of a predetermined time/voltage applied) was determined at a retention time of 16.7 ms or 500 ms.

By way of comparison, the liquid crystal cell prepared by the same procedures used above except that the cleaning of the substrates were carried out using a detergent solution simply comprising 30% by weight of polyoxyethylene nonylphenyl ether (hereinafter referred to as "comparative composition"; NCW601A, available from Wako Pure Chemical Co., Ltd.) and the foregoing properties were likewise determined. As a result, it was confirmed that the detergent composition of the present invention could ensure a retention of a liquid crystal cell, irrespective of the kinds of liquid crystals, identical to or superior to those achieved by the comparative composition.

What is claimed is:

1. In a process for producing liquid crystal display devices, a method for cleaning the surface of a glass substrate having an organic resin film deposited thereon, which method is performed prior to assembling the liquid crystal display cell and comprises the steps of (1) applying the organic film to the surface of the glass substrate, (2) subjecting the film surface to a rubbing treatment for the purpose of liquid crystal orientation, (3) cleaning the rubbed organic film surface with a detergent solution in order to remove pieces of the organic film, rubbing medium, peeled pieces of human tissue or cells, oils and fats from said surface, and (4) rinsing the cleaned surface with deionized water, said detergent comprising the following components (A) and (B):

(A) a compound selected from the group consisting of the compounds represented by the following general formula (1):

$$R_1\text{—}O\text{—}(A_1O)_n\text{—}R_2 \qquad (1)$$

wherein $R_1$ represents an alkyl group having 1 to 7 carbon atoms, an alkenyl group having 2 to 7 carbon atoms or a phenyl group; Al represents an alkylene group having 2 to 4 carbon atoms; $R_2$ represents an alkyl group having 1 to 6 carbon atoms, an alkenyl group having 2 to 6 carbon atoms or a hydrogen atom; and n is an integer ranging from 1 to 6;

(B) a compound selected from the group consisting of the compounds represented by the following general formulas (2) and (3):

$$R_3\text{—}O\text{—}(A_2O)_m\text{—}H \qquad (2)$$

wherein $R_3$ represents an alkylphenyl or alkenylphenyl group having 12 to 25 carbon atoms; $A_2$ represents an alkylene group having 2 to 4 carbon atoms; and m is an integer ranging from 5 to 25;

$$R_4\text{—}O\text{—}(A_3O)_m\text{—}H \qquad (3)$$

wherein $R_4$ represents an alkyl or alkenyl group having 8 to 25 carbon atoms; $A_3$ represents an alkylene group having 2 to 4 carbon atoms; and m is an integer ranging from 5 to 25.

2. The method of claim 1 wherein the organic film is polyimide film.

3. The method of claim 1 wherein the concentration of total amount of (A) and (B) in the detergent solution ranges from 0.1 to 10% by weight.

4. The method of claim 1 wherein component (A) is a compound represented by formula (1) wherein $R_1$ is an alkyl group having 4 to 6 carbon atoms and $R_2$ is hydrogen.

5. The method of claim 1 wherein the compound represented by the general formula (a) is an alkylene oxide adduct of octylphenol or nonylphenol.

6. The method of claim 1 wherein the compound represented by the formula (2) is an alkylene oxide adduct of secondary alcohol having 10 to 16 carbon atoms.

7. The method of claim 1 which the treating step comprises immersing the substrate having a rubbed organic film surface in the detergent solution while applying ultrasonics.

* * * * *